Aug. 21, 1945.     H. M. WEIR     2,383,174
RECOVERY OF VALUABLE HYDROCARBONS
Filed Feb. 17, 1940     3 Sheets-Sheet 1

Fig. 1.

Inventor:-
Horace M. Weir
by his Attorney
Hugo A. Kenway

Patented Aug. 21, 1945

2,383,174

UNITED STATES PATENT OFFICE 2,383,174

RECOVERY OF VALUABLE HYDROCARBONS

Horace M. Weir, Wynnewood, Pa., assignor to The United Gas Improvement Company, a corporation of Pennsylvania Application February 17, 1940, Serial No. 319,373

12 Claims. (Cl. 62—124)

This invention pertains generally to the purification of styrene and particularly to the purification of styrene from (a) gas condensates including tar obtained in the manufacture of artificial gas; (b) cracked petroleum products; (c) coal tar distillates; and (d) synthetic sources such as processes for the manufacture of synthetic unsaturated hydrocarbons.

The invention pertains more particularly to the purification of crude styrene fractions derived from light oil obtained in the manufacture of gas by methods such as the decomposition of petroleum oil by a process involving pyrolysis, catalysis, or both.

The invention pertains still more particularly to methods for purifying crude styrene materials with the ultimate recovery of pure or substantially pure styrene ($C_6H_5.CH:CH_2$).

Various processes for the manufacture of artificial gas and particularly hydrocarbon-containing gases, such as oil gas, carburetted water gas, or coal gas, yield considerable quantities of tar as well as substantial quantities of other readily condensible constituents of the freshly produced gas. The relatively less volatile components of the gas may be separated therefrom in condensing and/or scrubbing or other equipment associated with the gas-making apparatus for the purpose of producing a substantially tar-free and preferably gum-free gas suitable for general distribution as a fuel gas without clogging the gas services and appliance outlets.

The lower temperature condensates as well as distillate from the tar are herein generally designated as "light oil" and as such comprise valuable sources for numerous resin-forming unsaturated hydrocarbons such as styrene, indene, methyl styrene, cyclopentadiene, isobutylene, isoprene, piperylene, butadiene, all of which are of commercial importance.

It is often important to obtain these various hydrocarbon compounds in a substantially pure state, but using conventional methods of fractional distillation, it is impossible to effect the separation of the resin-forming compounds in a substantially pure state because of the presence in the exceedingly complex mixture of other materials which apparently are of similar boiling points, or are capable of forming azeotropic mixtures with the desired hydrocarbon. Additionally, many of these unsaturated hydrocarbon materials and their constituents are thermally unstable and tend to polymerize with heat, which further adds to the distillation difficulties—especially when working in the higher boiling ranges.

Thus, a typical styrene fraction obtained by ordinary distillation technique may contain but little more than 50% styrene. However, for many purposes, it may be desirable or essential to obtain a styrene which is very nearly pure or substantially so, such as for use in the preparation of polymerized styrene resins, or as a starting material in the preparation of styrene derivatives.

I have discovered that the recovery of a substantially pure styrene from a crude material derived from the source indicated may be advantageously effected on an industrial scale by a controlled method of crystallization utilizing (1) dilution with a liquefied normally gaseous hydrocarbon, (2) internal cooling effected by the vaporization of at least a portion of said hydrocarbon, and (3) separation of styrene crystallized due to temperature decrease and/or concentration of the solution.

Fractional crystallization as a general method of separating and recovering certain organic compounds from mixtures thereof is well known. Such procedure has also been suggested for the recovery of styrene from mixtures obtained in its preparation synthetically, as shown by German Patent 534,476 and U. S. Patent 2,110,833.

My method differs from such prior art methods, first, in the use as a diluent of a liquefied normally gaseous hydrocarbon which I have discovered is excellently adapted for this purpose, and second, in the use of internal refrigeration effected by the vaporization of a part of said diluent hydrocarbon, with or without supplemental indirect cooling.

As applied to light oil styrene fractions, my process differs in that light oil which contains essentially impure and extremely difficultly separable styrene is first processed, such as by distillation, to obtain a crude styrene fraction of desired concentration, and the crude styrene fraction thus obtained is then subjected to fractional crystallization under conditions involving the use of a liquefied normally gaseous hydrocarbon as a diluent and as an internal refrigerant. When distillation is employed to obtain the styrene fraction from the light oil it is preferably conducted under vacuum in the absence of any substantial steam and under conditions such that the maximum temperature does not exceed 110° C. and preferably does not exceed 100° C.; i. e., it is preferable to distill under reduced pressure since styrene boils at 145° C. at 760 mm. pressure.

While distillation under vacuum without steam is preferred, steam may be employed without departing from the broad concept of the invention as will be apparent from the description herein.

However, broadly speaking, the crude styrene-containing materials to which my process may be applied may be derived from any source.

The crude styrene fraction from which pure styrene may be recovered by my process may have any desired boiling range.

As an illustration, the crude styrene fraction may have a boiling range from 125 to 165° C. or wider, although I prefer to use narrower fractions for example, fractions with boiling points which do not greatly exceed the range of 135 to 155° C., or better, of 140° to 150° C.

Excellent results are obtained when using crude styrene fractions with boiling ranges between about 142° to 148° C.

The preferred distillation step produces a crude light oil fraction rich in styrene and in the xylenes, the boiling points of which lie close to that of styrene.

The process hereinafter more particularly described may be used to separate pure styrene by crystallization from a mixture containing xylenes and other similarly boiling hydrocarbons provided the concentration of styrene in the mixture is greater than its concentration in the typical eutectic mixture of styrene and such other materials. By alternate and repeated concentration of styrene by distillation to a point fairly above the eutectic followed by crystallization of styrene without solidification of eutectic mixture, a larger part of the styrene can be separated as pure material.

I have discovered that propane (B. M. −44.5° C.; F. P. −189.9° C.) is especially well adapted for use as diluent and direct or internal refrigerating agent in my process.

While propane has been previously used as a diluent and direct cooling agent in the oil dewaxing art, I have found that its use in my process leads to unexpected results when treating crude styrene-containing materials, such as light oil fractions from the source indicated, for the recovery and purification of styrene.

One such result is that in my process the styrene crystallizes in high purity and in good crystal size even though the rate of cooling is extremely rapid. Another such result is the production of well-formed easily filterable crystals of styrene. Unlike the case of separating wax from oils in the oil de-waxing art, when propane is used as the diluent and direct cooling agent for the light oil fraction or other crude styrene-containing material, the styrene crystals which are produced under the widest range of operating conditions (such as temperature, pressure, feed, etc.) are separable from the mother liquor containing them with great ease. Moreover, the styrene crystals in the presence of my diluent do not form sticky or closely adhering aggregates and thus may be readily washed or otherwise freed from adherent mother liquor.

Another advantageous result flowing from the use of my diluent-refrigerant in the case of styrene is the absence of substantially any effect upon the composition of the eutectic mixture of styrene with the remaining constituents of the light oil fraction undergoing treatment. As the temperature is reduced, and assuming that the light oil fraction undergoing treatment is free from propane or other added solvent and has a styrene concentration greater than the concentration of styrene at the eutectic point, crystals which are apparently substantially pure styrene continue to separate until the mother liquor reaches the eutectic in composition. This eutectic mixture contains about 33% to 35% styrene. I have discovered that the addition of propane to a styrene fraction has substantially no effect upon the composition of the foregoing eutectic mixture. In other words, although the addition of propane lowers the temperature range through which styrene crystals separate from a mixture richer in styrene than the eutectic, it does not increase the styrene content of the eutectic mixture (calculated on a propane-free basis). This makes it possible to recover on an industrial scale by the use of my process styrene crystals from styrene fractions having styrene concentrations such as are readily obtainable by fractional distillation.

Another advantageous result of my process is a sharp separation of styrene in strictly non-mixed crystal form from a variety of similar materials, both saturated and unsaturated, from which it is otherwise extremely difficultly separable, and some of which similar materials even in extremely small concentration have a profound effect upon the quality of styrene resins.

Still another advantageous result is the desirably low viscosity of the propane at the low temperatures encountered in the system.

Generally speaking, my process embraces the purification of crude styrene materials by a three-step operation.

In the first step, a charge stock of crude styrene material (in which the styrene content may preferably be about 50% or over—although any concentration may be used in excess of the approximately 33% which represents the styrene content of the eutectic) is admixed with a liquefied normally gaseous hydrocarbon, for example propane. The mixing may take place at atmospheric temperature or at temperatures above or below atmospheric though preferably at atmospheric or below. The pressure may be maintained above atmospheric, if necessary, so as to maintain the normally gaseous hydrocarbon in the liquid state. A portion of the added liquefied normally gaseous hydrocarbon is then evaporated such as under reduced pressure if necessary, to produce the desired low temperature for crystallization of styrene. Styrene is thereby crystallized from the mixture.

If desired, cooling may be carried to the point where the mother liquor is reduced in styrene content to substantially the eutectic composition which is of approximately 33% styrene content calculated on the basis of total mother liquor less added diluent.

In the second step, the styrene crystals are separated from the bulk of the mother liquor by any means adapted to the separation of solid material from liquid material, such as, for instance, by filtration, or by centrifuging, or otherwise.

In the third step, the styrene crystals are treated to separate mother liquor adhering thereto. This may be done (a) by washing the styrene crystals, such as with propane while on the filter or in a centrifuge, or otherwise, until substantially all of the mother liquor is removed; (b) by subjecting the styrene crystals to high speed centrifuging, thereby generating a centrifugal force sufficiently high to overcome the adhesion of the last vestiges of mother liquor held on the styrene crystals by forces of adsorption; or (c) by any combination of the foregoing; or otherwise.

Some washing may be conveniently employed to remove the major part of adherent mother liquor from the styrene crystals and the styrene subsequently re-dissolved and recrystallized for the removal of last traces of impurities, for example, by repeating the above cycle of operations.

The mother liquor remaining after separation of styrene crystals may be concentrated, if desired, such as by distillation and to any desired extent, say to a styrene content of 50% or more, and reprocessed for the recovery of further quantities of styrene.

The crystallization procedure of the first step, followed by the separation of styrene crystals in the second step will produce a styrene which may run as high as 90 to 95% in purity, or higher. Where styrene of greater purity is desired, the third step as outlined above is employed. However, the preferred procedure is to lightly wash the styrene crystals separated in step 2 with propane in step 3 and then repeat the cycle of operations, whereby styrene of at least substantially 100% purity may be obtained.

Having thus described my invention in general terms, the following more detailed description of preferred embodiments thereof, taken in conjunction with the accompanying drawings, will enable those skilled in the art to become more familiar therewith. It is to be understood, however, that the particular description is illustrative, and that other procedures will suggest themselves to those skilled in the art upon becoming familiar with my invention.

Figure 1:
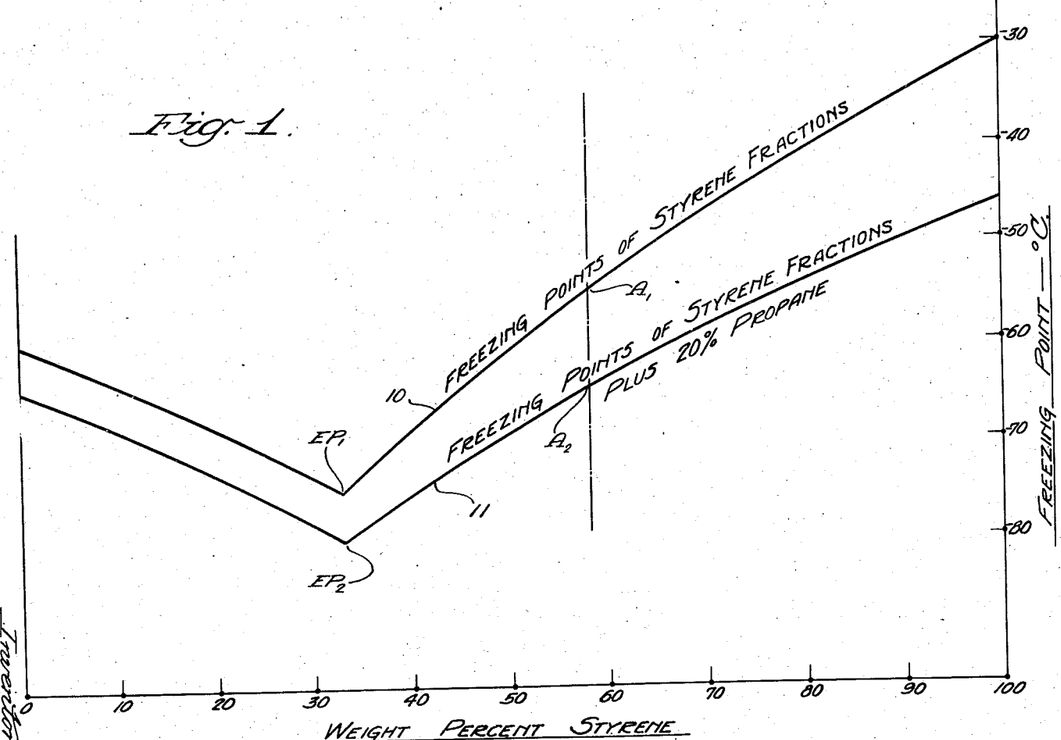
Figure 1 shows curves illustrating certain properties of crude styrene from one preferred source.

The curves of Figure 1 are freezing point diagrams for typical crude styrene fractions obtained from light oil produced in the manufacture of hydrocarbon gas. The curves 10 and 11 were obtained by plotting the initial freezing point of each of a number of crude styrene fractions of different concentration against its styrene content, neglecting in the case of curve 11 the diluting effect of the propane on the styrene concentration.

The lower curve thus illustrates the effect of the addition of 20% of propane on the initial freezing points of styrene in styrene fractions of different concentrations, but the concentration of styrene in each fraction was taken as if no propane were present. For example, an undiluted styrene fraction of about 58% styrene begins to crystallize at about $-55°$ C., as shown by the point $A_1$ on the upper curve. The same fraction in the presence of 20% propane begins to crystallize at about $-65°$ C., as shown at $A_2$.

As clearly indicated the addition of propane lowers the freezing point but does not change the styrene content of the eutectic; in other words, the ratio of styrene to the remaining constituents in the eutectic mixture, calculated upon a propane-free basis, remains substantially unaltered when propane is added.

The eutectic points are indicated on curves 10 and 11 at $EP_1$ and $EP_2$, respectively. Upon cooling a crude styrene fraction containing more than about 33% styrene (representing the eutectic composition) pure styrene crystals will separate and the liquid phase will become correspondingly poorer in styrene. The change in composition will follow along the cooling curve, for example, along curve 11 from $A_2$ to $EP_2$, if the composition of the starting material be taken as $A_2$, until the eutectic point is reached. At this point the solid and liquid phases are substantially identical in composition, disregarding the presence of propane. Continued cooling will then result in solidification of the eutectic liquid phase, but with no further reduction in temperature during the solidification. The freezing point diagram, therefore, indicates the order of the styrene content below which it is not desirable, and of course not necessary, to go during the operation of my process.

Referring now to the left hand portions of curves 10 and 11 which represent conditions under which the styrene content is less than in the eutectic, upon cooling of any mixture in this portion of the diagram crystals other than styrene separate.

Incidentally, the very extreme left of curves 10 and 11, that is the points at which they intersect the zero-styrene ordinate were obtained by extrapolation.

Figure 2:
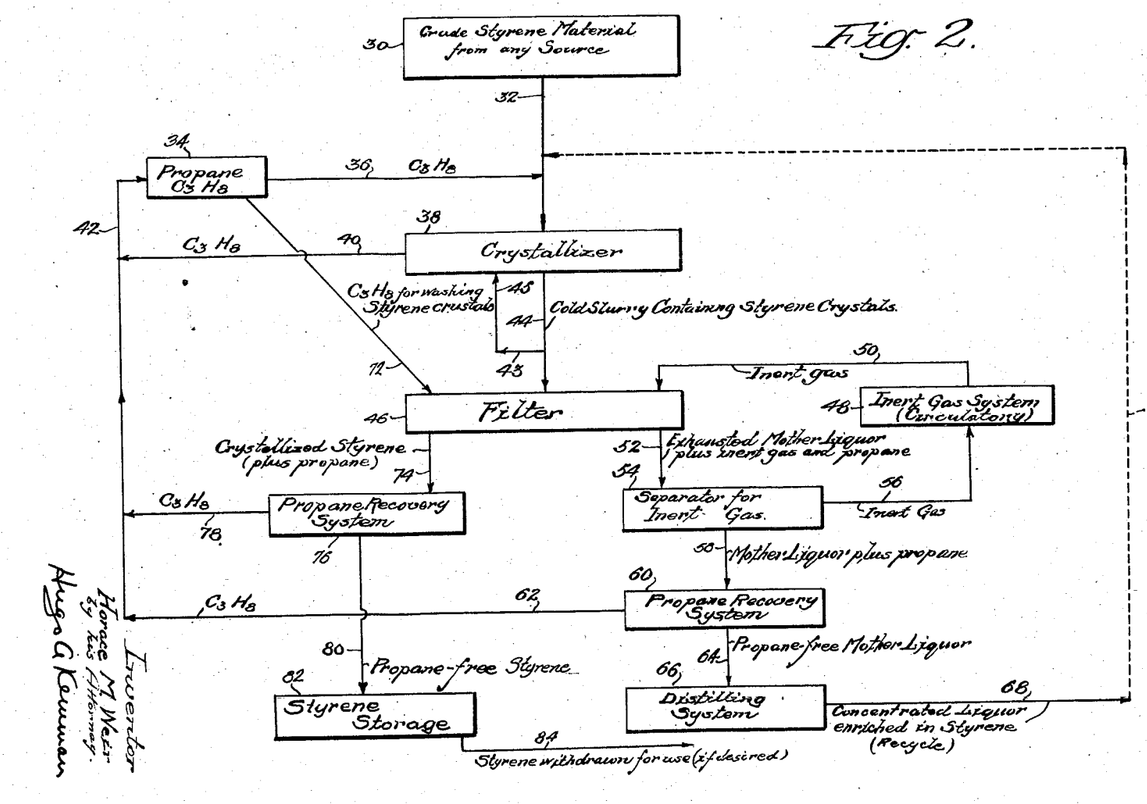
Figure 2 represents a flow sheet illustrating one embodiment of my invention.

Referring now to Figure 2, which is a flow sheet illustrating diagrammatically one manner of practicing my invention, I show diagrammatically at 30 a source of crude styrene material with its introduction via line 32 into the system for subsequent treatment. From this the general applicability of my invention to crude styrene-containing material from any source whatsoever is intended to be shown.

The crude styrene material is admixed with a liquefied normally gaseous hydrocarbon such as propane introduced from liquid propane source 34 by line 36. The mixture of liquid-phase material is then introduced into a crystallizer 38 wherein very low temperatures are induced by the evaporation of a part of the propane at a pressure usually determined by the low temperature desired. Thus I frequently resort to reduced pressures to obtain temperatures lower than are obtainable at atmosphere pressure. If desired, evaporation may take place under substantially adiabatic conditions such as in a thermally insulated zone, or resort may be had to some indirect cooling, or both may be employed, or otherwise. Propane gas is withdrawn from the crystallizer 38 at controlled rates to obtain pressure and consequently temperature regulation via line 40. By the use of appropriate means (not shown) the gaseous propane thus withdrawn may be condensed and returned to liquid propane source 34 via line 42 for re-use.

Mechanical or other agitating means may be provided in crystallizer 38 if desired.

The temperature in the crystallizer 38 is thus reduced sufficiently to cause crystals of styrene to be formed in the mixture. The temperature in the crystallizer 38 should, of course, not be reduced sufficiently to cause eutectic to solidify for this may result in the formation of mixed crystals or otherwise contaminate the solidified styrene.

The magna, slurry, or suspension containing styrene crystals is then introduced through line 44 into a system for the separation of the solid from at least the bulk of the liquid phase.

As indicated in the flow sheet, this system may comprise the filter 46. Any type of filter may be employed, such as for example the well-known continuous rotary filter of conventional construction or otherwise.

On the other hand, other types of filters or other separating equipment (e. g., centrifugal separators) may be used for this purpose.

Although the crystal slurry or suspension may flow from the crystallizer 38 to the filter 46 (or other separating means) directly as via line 44, I find it desirable in many instances to maintain a circulatory flow of slurry as by means of lines 44, 43 and 45 from which circulating stream of slurry any desired quantity may be withdrawn for introduction to the filter 46 when and as needed.

In this way the feed of crude styrene material and propane to, and the withdrawal of gaseous propane from, the crystallizer and the withdrawal of slurry from the circulating stream for introduction into the filter or other separator, may be easily and quickly adjusted to any change in operating conditions without disturbing any other portion of the system. A convenient means of withdrawing the slurry at substantially the rate at which it is produced is thus also afforded.

Within the filter 46 which preferably is also maintained at low temperatures, filtration may be in any desired manner, for example, by differential gas pressure. At the low temperatures at which it is desirable to maintain the filtration zone during the separation step, the vapor pressure of propane is relatively low. For example it is below about 200 mm. when the temperature is below about −70° C. Hence I find it desirable when using differential gas pressure for filtration purposes to employ a supplemental gas to increase the total pressure during the separation step and thereby facilitate the filtering operation. The supplemental gas may be air but, in view of the inflammability of propane, preferably comprises an inert gas such as nitrogen or carbon dioxide. Accordingly, I have shown inert gas as being withdrawn from the inert gas system 48 (which may comprise inert gas supply, storage and pumping means of conventional design, or otherwise) and as being introduced to the filter 46 as via line 50.

In practice, substantially atmospheric pressure may be maintained on the charge side of the filter and subatmospheric pressure on the discharge side. Filtration preferably takes place at very low temperature, and preferably before the slurry from the crystallizer has had time to undergo any considerable change in temperature.

The filtrate of depleted mother liquid (i. e., partially exhausted with respect to styrene) plus inert gas and propane are shown as being discharged from the filter 46 through line 52 which leads to the separator 54.

Within the separator 54, which may be of any desired design adapted to effect substantial separation of gas and liquid phases, the inert gas is separated from the mother liquor and may be returned into the inert gas system 48 via line 56.

The depleted mother liquor containing propane passes from the separator 54 through line 58 into the propane recovery system 60 where the substantial portion of the propane may be removed by any desired method such as, for instance, gentle heating and further reduction in pressure. The propane thus recovered may be condensed and returned for re-use via lines 62 and 42.

The depleted mother liquor, substantially propane-free, flows through line 64 to the distilling system 66 which produces therefrom a concentrated liquor considerably enriched in styrene. This concentrated mother liquor may be recycled via lines 68, 70 and 32 to crystallizer 38 for further treatment, for example, alone or in admixture with fresh quantities of crude styrene material from source 30.

Returning to the separation step at filter 46, the styrene crystals after their initial separation from mother liquor, may be subjected to a washing step, for example, and conveniently, prior to their removal from the filter bed of filter 46. I find that liquid propane is admirably suited as a washing agent, both because it has a highly selective solvent effect for mother liquor as distinguished from styrene at the low temperatures involved, the adherent mother liquor being efficiently washed from the crystal surfaces with substantially negligible redissolution of crystalline styrene in the wash propane, and because its use involves the introduction of no additional substance in to the system requiring separate removal from the materials already in the system. Wash propane may be introduced into the filter 46 for washing purposes from propane source 34 via line 72 as indicated. Commercial filters of the well-known continuous rotary type are excellently adapted for carrying out such a washing step.

However, washing of the crystals may take place in any other manner and/or at any other point, as for example after their removal from the filter 46 or equivalent separator.

Instead of using a rotary filter of the type indicated the motor liquor for example may be removed from the crystalline material by subjecting the mass to treatment in a revolving centrifuge, introducing at the end of the operation liquid propane at the center of the revolving basket such as in the form of a spray or mist of droplets, the propane passing outwardly through the annular mass of crystals built up on the perforated circumferential wall of the centrifuge basket and carrying mother liquor with it. The quantity of wash liquid required is, generally speaking, a function of the centrifuge speed in that the higher the speed of the centrifuge the less wash liquid required. In fact, at very high angular velocities whereby very high centrifugal forces are generated, a substantially complete removal of the adherent liquor from the crystal surfaces is apparently obtainable without washing. In the latter case, propane washing may be dispensed with altogether, if desired.

Since a centrifuge is in itself a filter it may be substituted at 46. Washing may then take place if desired, inside the filter as above indicated.

The mass of styrene crystals plus any residual propane, as shown, is discharged from the filter 46 via line 74 into propane recovery system 76 which, like propane recovery system 60 already described, serves to remove residual propane by any convenient means such as distillation based upon the wide difference in boiling points between styrene and propane. The said residual propane may be withdrawn via line 78 and, like the propane withdrawn from the crystallizer 38 through line 40, may be condensed and returned to liquid propane source 34 via line 42 for re-use.

If desired, a polymerization inhibitor may be added to the styrene at this point, for instance, as it leaves the filter 46, so that undesirable polymerization may be avoided. The use of a polymerization inhibitor is frequently desirable if the temperature of the styrene is to be increased during any subsequent treatment, or during storage. As polymerization inhibitor, I may use any one or more of the substances known in the art as useful for this purpose.

The styrene after being freed from residual propane at 76, as shown, flows via line 80 to styrene storage 82 from which it may be withdrawn for use as desired by means of line 84.

This styrene will be of a purity depending upon the extent of washing effected during the washing step. For instance, by a moderate degree of washing a purity of 95% is readily obtainable. With higher and higher degrees of washing, higher and higher purities are obtainable until substantially 100% purity is obtained.

I find, however, at the present state of development of filters, that it is usually uneconomical to obtain 100% purity solely by washing since I have found that it is usually not economically advantageous, though it is physically possible to avoid re-solution of styrene by washing with hydrocarbon liquid substantially saturated with styrene.

I, therefore, at present prefer to carry the purity during the first treating cycle to a point below 100%, say, 95%, and then reprocess the material by repeating the above cycle of three steps comprising crystallizing, filtering and washing or its equivalent.

Figure 3:
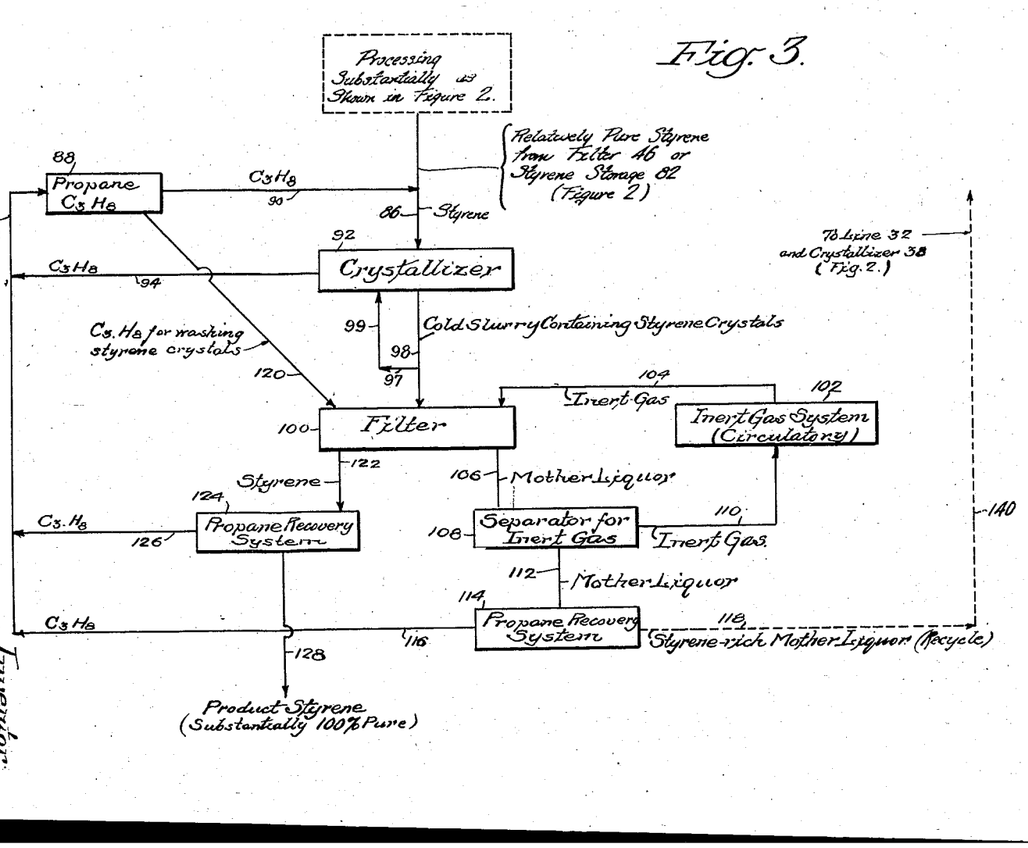
Figure 3 represents a flow sheet illustrating another embodiment of my invention.

This second cycle of operations is indicated in Figure 3 which is a schematic flow sheet of steps for the further treatment of styrene obtained from the first treating cycle.

Since the first treating cycle may be the same as that shown in Figure 2, if desired, it is unnecessary to again describe this cycle. Therefore, the description will begin with line 86 which may communicate with filter 46, or storage tank 82, or any other source of styrene crystals, or relatively pure styrene, say of 85% purity or higher, however produced.

Thus, after some washing, approximately 95% styrene for example may be withdrawn directly from the filter 46 through line 86 and admixed with liquid propane introduced through line 90 from propane source 88. The mixture of propane and styrene is then introduced into a crystallizer 92 wherein the required low temperature (but not necessarily the same temperatures and pressures as in Figure 2) are induced by the evaporation of the propane at any suitable pressure, for example under reduced pressure. Propane gas is withdrawn from crystallizer 92 at controlled rates via line 94 for regulation of temperature in the crystallizer and may be condensed and returned by appropriate means to propane source 88 via line 96 for re-use.

In general, the construction and operation of the crystallizer 92 may be similar to that of crystallizer 38.

At the low temperatures induced in the crystallizer 92 crystals of styrene of substantially 100% purity are formed.

The slurry or suspension containing these crystals is led through line 98 into a system for the separation of the solid from the liquid phase. A circulating stream of slurry may be established by means of line 97, 98 and 99 from which slurry may be withdrawn for introduction into a separation zone when and as needed, as previously described in connection with crystallizer 38. The separator may comprise the filter 100 which may be generally similar in construction and operation to filter 46.

In this cycle also filtration may be secured through the use of differential gas pressure, as is common in filters of the continuous rotary type. The inert gas system indicated at 102, 104 and 110 may be provided which functions similarly to the previously described system indicated at 48, 50 and 56 respectively.

The filtrate of depleted or partially exhausted mother liquor (which in this second cycle may conveniently run as high as about 85% in styrene, depending upon the operation sought) plus inert gas and propane are discharged as shown from the filter 100 through line 106 into the separator 108 which may be like separator 54 in construction and function for separating gas and liquid phases.

The depleted mother liquor substantially freed of inert gases is discharged via line 112 into the propane recovery system 114 where a substantial portion or all of the propane may be removed from the liquor (such as in a stripping column), condensed and returned to propane source 88 via lines 116 and 96 for re-use. The depleted mother liquor from the second cycle is still rich in styrene and may be sent back for treatment in the first cycle through lines 118 and 140 to line 32 and crystallizer 38 of Figure 2 for treatment alone or in admixture with fresh quantities of crude styrene material from source 30. In case this mother liquor is to be reprocessed, the propane recovery step at 114 may conveniently be omitted since the reprocessing itself involves admixture with fresh quantities of propane.

In case the magma or slurry of mother liquor and styrene crystals become too stiff to pump at any stage of the process due to high content of styrene crystals, propane may be added to dilute it and make it more easily handled.

Returning to the filtration step at 100, the styrene crystals after separation of the bulk of the mother liquor may be washed with propane to remove mother liquor adhering thereto. If desired this may take place prior to the removal of the styrene crystals from the filter bed, or otherwise. For example wash propane may be introduced into the filter from propane source 88 through line 120 for washing purposes. As previously indicated, the step of washing the crystals with propane may be replaced by a treatment in a high speed centrifuge or, if preferred, washing and centrifuging may be combined to remove adherent mother liquid from the styrene crystals.

I find that in the second cycle washing may be carried out in a manner to remove all of the mother liquor from the styrene crystals without entailing for large scale operations a too high loss of styrene crystals by solution in wash liquid.

As shown, separated crystallized styrene plus residual propane are transferred from the filter 100 via line 122 into propane recovery system 124 wherein the residual propane is separated and withdrawn through line 126, for example in a manner similar to that previously described in connection with propane recovery system 76. The propane thus recovered may be similarly recycled for re-use.

Product styrene as shown, is withdrawn through line 128 in highly purified form.

It will be understood that duplicate equipment may be provided for simultaneously carrying out the procedures shown in Figures 2 and 3; or alternatively, the crude styrene material may be initially processed according to the first cycle, for example, as shown in Figure 2 and the relatively pure styrene thus obtained stored as, for example, in styrene storage means 82, and subsequently reprocessed according to the second cycle, for example, in the manner shown in Figure 3 in the same equipment that was utilized for the first cycle. In this way the production of 100% pure styrene by the recrystallization procedure of the second cycle does not require the construction of duplicate equipment.

As indicated previously, however, it is entirely feasible to obtain practically 100% pure styrene by the crystallization procedure of the first cycle shown in Figure 2, by observing the precautions indicated as necessary or desirable to recover styrene crystals of increased purity.

Make up propane, to compensate for unavoidable losses, may be added at a suitable point, such as at 34 and 88.

From the foregoing, those skilled in the art will readily appreciate that I have provided an effective method for purifying crude styrene-containing materials with the ultimate recovery of styrene in as high a degree of purity as may be desired. Since no extensive heating is required (in contrast to what would be required if an attempt were made to obtain substantially pure styrene primarily by distillation) losses to styrene as well as contamination of the styrene product through polymerization reactions are very materially reduced.

It will also be seen that for any given lot of propane-diluted crude styrene subjected to crystallization in accordance with the first cycle as exemplified in Figure 2, the operative temperature range in the crystallizer is between the temperature at which styrene crystals initially appear and the temperature at which the mother liquor becomes so depleted in styrene as to form a eutectic mixture. Above this range there will, of course, be no styrene crystals and below this range eutectic mixture begins to solidify to contaminate the solid styrene phase. In fact, for purposes of safety the lower end of the operative temperature range should preferably be safely above the temperature at which the mother liquor becomes so depleted in styrene as to become eutectic mixture.

When the process is operated on a continuous scale, for example, as described in connection with Figure 2, or Figure 3, or both, the percentage of liquid propane dilution in the crystallizer may be adjusted, for example, raised or lowered or kept constant, by an adjustment of the ratio of feed propane to feed crude styrene. It is understood, of course, that after conditions in the crystallizer come to equilibrium as a result of (1) the continuous feeding of propane and crude styrene, (2) the continuous evaporation of a portion of the feed propane for cooling purposes, and (3) the continuous withdrawal of slurry with or without a return of a part of the slurry to the crystallization chamber, that other conditions remaining unchanged, the percentage of propane dilution in the crystallizer may be raised or lowered by increasing or decreasing, respectively, the ratio of feed propane to feed crude styrene; that other conditions remaining unchanged, the temperature in the crystallizer may be raised or lowered by decreasing or increasing, respectively, the rate of propane evaporation; and that other conditions remaining unchanged, the withdrawal of slurry with or without the return of a portion of the slurry to the crystallizing chamber need not affect the percentage of liquid propane dilution in the crystallizer provided the contents of the crystallizer are kept thoroughly mixed.

It will be understood, of course, that the ratio of feed propane to feed crude styrene and the rate of propane evaporation might be adjusted simultaneously, keeping in mind what has been said above. It will also be understood that slurry might be removed from the crystallization zone in other than aliquot portions without departing from the broad concept of the invention. That is, the slurry which is withdrawn need not necessarily be of the same composition as the slurry remaining behind in the crystallizer.

In batch operations, if it is desired to operate in the lower end of the permissible temperature range, consideration should be given to the percentage of liquid propane which will be present at the end of the crystallization step, that is, when the desired low temperature at which filtration takes place is reached, since a part of the propane introduced into the crystallization zone will have been evaporated for reducing the temperature. However, such evaporated propane may be replaced in whole or in part by the addition of further liquid propane during the evaporation, if desired.

It will, of course, be understood that in practicing my invention, either on the continuous, semi-continuous, batch or other scale, should the temperature, accidentally or otherwise, be reduced below the point at which eutectic mixture begins to solidify, an increase in the percentage of propane in the mix by adding additional propane directly, or increasing the ratio of feed propane to feed crude styrene, or an increase in the temperature, or a suitable adjustment of both temperature and propane dilution will tend to establish or re-establish desired conditions in the crystallization zone; namely conditions under which all eutectic mixture remains in liquid solution.

Thus it will be seen that, broadly speaking, th end conditions in the crystallizing step, or in othe words the conditions of temperature and propane dilution obtaining in the slurry at the time of separation of styrene crystals herefrom, may be arrived at in a variety of different ways, and that even though eutectic might have become solified accidentally (or even intentionally, if for any reason this is done) the solidified eutectic might be redissolved either by raising the temperature or by increasing the percentage of propane in the slurry, or both, or otherwise.

Raising the temperature can be effected in any desired manner, for instance, if the operations are conducted on a continuous scale by reducing the rate of propane evaporation.

It will, of course, be understood that it is unnecessary to approach the lower end of the operative temperature range to successfully operate the process and that the apparent purpose for doing so is to increase the yield of styrene crystals.

The data of Table 1 below is interesting in that it shows the temperatures at which variously propane-diluted liquid mixtures of styrene and xylene substantially reach a eutectic mixture, which, for purposes of illustration and possibly to afford a small factor of safety, has been assumed to have a composition of 35% styrene and 65% xylene.

Table I

| Per cent propane in liquid | Per cent eutectic (taken as 35% styrene—65% xylene) in liquid | Temp., °C. |
|---|---|---|
| 0 | 100 | −72 |
| 10 | 90 | −74.5 |
| 20 | 80 | −77 |
| 30 | 70 | −78.5 |
| 40 | 60 | −80.5 |
| 50 | 50 | −83 |
| 60 | 40 | −87 |
| 70 | 30 | −93 |

From this table it will be noted that when no propane is present a liquid mixture of styrene and xylene becomes depleted in styrene down to 35% at a temperature of −72° C., and that this temperature decreases as more and more propane is added, the temperature being −93° C. for example, when the liquid mixture contains 70% propane.

If we assume that the depletion of the mother liquor down to 35% styrene is the lower end of the operative range for practicable purposes, Table I shows approximately the lowest safe operating temperatures for various percentages of liquid propane dilution.

Thus, when the liquid propane dilution is 10%, the approximately lowest safe temperature is −74.5° C. and when the liquid propane dilution is 70%, the approximately lowest safe temperature is −93° C.

I find in practice that another factor enters the picture, namely, the fluidity of the magma or slurry of mother liquor and crystallized styrene formed in crystallizer 38, or crystallizer 92.

I find, for example, that to insure a magma or slurry sufficiently fluid for easy handling, I prefer to have the percentage of liquid propane present at least 35% and that for practicable purposes I rarely prefer to go above 65%.

Thus, when the propane dilution is 35%, the lowest safe operating temperature is approximately −79.5° C., and when the propane dilution is 65% the lowest safe operating temperature is approximately −90° C., and that the lowest safe operating temperatures for intermediate propane dilutions lie between approximately −79.5° C. and −90° C.

The data of Table I is also of considerable interest in connection with the use of liquid propane for washing purposes.

It will be appreciated that when pure or substantially pure liquid propane is employed for washing mother liquor from the faces of styrene crystals, unless the wash liquid is repeatedly used for washing purposes, such as by recycling, the concentration of mother liquor in the wash liquid will rarely, if ever, reach a concentration as high as 20 or 30%.

Thus in Table I, it will be seen that wash propane might be used at temperatures as low as −93° C. and lower without danger of contaminating the styrene crystals by separation of solid eutectic from the wash liquid, or by inability of mother liquor to be dissolved, since at these temperatures the solubility of eutectic mixture in propane is still substantial, namely of the order of 30%.

The solubility of pure styrene in propane at temperatures of the order of −90° C. on the other hand is very substantially reduced as compared to that at higher temperatures, as clearly shown in Table II.

Table II

| Temp., °C. | Solubility, gm. styrene in 100 gm. propane |
|---|---|
| −40 | 910 |
| −50 | 223 |
| −60 | 56 |
| −70 | 22 |
| −80 | 10 |
| −90 | 5 |

Upon reference to Table II it will be seen that the solubility of styrene, expressed in grams in 100 grams of propane, is reduced to 10 at a temperature of −80° C. and to 5 at a temperature of −90° C.

The efficiency of propane as a wash liquid is thus clearly demonstrated. It will be seen that it is an ideal wash liquid from the standpoint of relatively low solubility of styrene and relatively high solubility of eutectic mixture particularly between the range of lowest safe operating temperatures for propane dilutions between 35% and 65% above referred to, namely approximately −79.5 and −90° C.

It is of course to be understood that the data of Tables I and II are for the most part illustrative and may be subject to some variation with change in conditions or change in type or source of material under treatment.

It will be understood that the recrystallization procedure of Figure 3 represents one preferred embodiment of separating and recovering styrene free from impurities from various sources. However, it is possible by the use of extensive washing and/or centrifuging with extremely high angular velocities to effect substantially complete separation of adherent mother liquor from styrene crystals initially produced as in Figure 2. Recrystallization has the advantage that it permits the removal of any foreign matter occluded in the crystals during the initial crystallization.

The mother liquor obtained in the recrystallization step is conveniently of about 85% styrene content depending of course upon how the process is operated. The recrystallization might be continued until the mother liquor in contact with the highly pure styrene crystals becomes of any lesser styrene content (down to the composition of the eutectic) without sacrificing all of the advantages of this step. In such case, however, the difficulty in removing last traces of adhering mother liquor from the crystalline material may be somewhat increased so that longer and more intensive washing and/or centrifuging would be required to produce a 100% pure product. It is for this reason that recrystallization is preferably carried only to a point at which the crystals produced may be most conveniently or economically separated, and the remaining mother liquor recycled.

As further illustrating the process according to my invention the following example is cited as typical of the results that may be obtained thereby. It will be understood that the proportions and conditions may be varied over an extremely wide range of conditions by those skilled in the art, upon becoming familiar with my invention.

*Example*

About 665 pounds per hour of a crude styrene fraction were mixed with 825 pounds of propane and 155 pounds of mother liquor rich in styrene from a previous recrystallization run. The mixture was introduced into crystallizer 38, which was maintained at very low temperatures of the order of about −79° C. by the rapid evaporation of a portion of the propane content of the mixture.

In this manner, by the evaporation of about 541 pounds per hour of propane about 1104 pounds per hour of a cold slurry containing styrene crystals was produced. This slurry was introduced into filter 46 and the crystallized styrene removed from the slurry. About 634 pounds per hour of wash propane were introduced into the filter with the recovery of about 623 pounds per hour of crystalline styrene plus propane of which about 306 pounds were styrene.

About 1115 pounds per hour of exhausted mother liquor and propane were recovered from the filter or separating zone and introduced into the inert gas separating means 54. The exhausted mother liquor plus propane was then introduced into propane recovery system 60, where about 601 pounds per hour of propane were recovered and returned to propane storage 34 for re-use. The mother liquor thus freed of propane at the rate of about 514 pounds per hour, was then introduced into distilling system 66 where it was enriched in styrene, thereby yielding a more concentrated liquor adapted for example, for further processing in admixture with fresh quantities of crude styrene material.

Reurning to the filter zone, the 623 pounds per hour of styrene-propane (including about 317 pounds of propane) there recovered were introduced into propane recovery system 76 where most of the propane, namely, about 304 pounds per hour, was separated and returned to propane storage 34 for re-use, leaving a mixture of about 319 pounds per hour of styrene-containing material (about 306 pounds of styrene plus about 13 pounds of propane) to be introduced into styrene storage means 82 via line 80.

In the recrystallization procedure—which was carried out in the same apparatus during a subsequent cycle—about 760 pounds per hour of relatively pure styrene mixture containing about 29 pounds of propane were mixed with about 1073 pounds of propane and introduced into crystallizer 92.

The low temperatures required for crystallization of pure styrene were induced by the evaporation under reduced pressure of about 512 pounds per hour of propane thereby producing about 1321 pounds per hour of cold slurry containing about 590 pounds of propane.

This cold slurry was introduced into filter 100 in order to separate the styrene crystals from the motor liquor. About 731 pounds per hour of wash propane were introduced into the filter.

About 1321 pounds per hour of mother liquor containing about 955 pounds of propane were obtained from the filter and introduced into the inert gas separator 108 and then into the propane recovery system 114. There substantially the entire propane content (955 pounds per hour) was recovered and returned to storage 88 for re-use. The 366 pounds per hour of mother liquor resulting from this second stage of recrystallization is very rich in styrene and may be directly returned for processing in admixture with fresh quantities of crude styrene material in the first cycle.

Returning to the filter 100, about 731 pounds per hour of styrene-propane mixture were recovered. This mixture was then introduced into propane recovery system 124 and in this manner substantially all the propane content thereof (about 366 pounds per hour) was removed, thus leaving as the final product about 365 pounds per hour of styrene of substantially 100% purity.

Although I have described my invention along the lines of a preferred embodiment, it will be understood that it is not to be construed as limited thereto, as other procedures will suggest themselves to those skilled in the art upon becoming familiar with the description of my process.

Thus, while my description concerns itself chiefly with the use of propane which is unusually well suited to the purpose my process, broadly speaking, might be carried out with other solvents having the requisite properties. Among such requisite properties are (1) a sufficiently low boiling point for internal refrigeration purposes; (2) miscibility with the liquid phase material through the range of temperatures involved; (3) a negligible effect upon the composition of eutectic mixture; (4) a low viscosity at low temperatures; and (5) the ability to permit or cause the separation of crystals in easily filterable form. Furthermore (6) it must not solidify at the low temperatures which result from its vaporization, and (7) it is preferably a hydrocarbon.

The hydrocarbon propane when chemically pure has a boiling point of —44.5° C. at 760 mm. Hg and a freezing point of —189.9° C. and therefore is especially well adapted to my process.

Other hydrocarbons may be utilized, such as n-butane (B. P. —0.5° C.; F. P. —135.0° C.) or ethane (B. P. —88.3° C.; F. P. —172.0° C.), or mixtures thereof—either with or without propane. With pure n-butane very low pressures are required to produce the desired low temperatures by self-refrigeration. On the other hand, extremely high pressures are encountered in the use of pure ethane even at the low temperatures involved. Accordingly it may be stated in the form of a general rule that a solvent for my process preferably should have a vapor pressure at any given temperature within the approximate range represented by pure ethane as the upper limit and pure n-butane as the lower limit.

Propylene (B. P. —47.0° C.; F. P. —184.9° C.) may be used as the solvent, as may a-butylene (B. P. —6.1° C.; F. P. —130° C.) although the use of saturated hydrocarbons may, in general, be preferred over unsaturated hydrocarbons. The saturated hydrocarbon isobutane (B. P. —10.2° C.; F. P. —145.0° C.) may also be used. Mixtures of any of the foregoing hydrocarbons may also be employed.

Liquefied normally gaseous materials other than hydrocarbons might also be utilized, such as dichlorodifluoromethane (B. P. —29.8° C.; F. P. —155° C.) since it has the required high vapor pressure, and is substantially inert under the conditions obtaining, as are the liquefied normally gaseous hydrocarbon solvents mentioned above.

I may also make use of mixtures of two or more solvents, each of which alone might be used even in cases where one constituent of the mixture does not possess a sufficiently high vapor pressure for satisfactory use by itself. However, the use of mixtures of solvents may in some instances give rise to troubles due to the more rapid vaporization of one constituent relative to the other with resulting fluctuations in pressure and temperature in various parts of the system—a result highly undesirable from the standpoint of close control of the temperature and pressure variables. On the other hand, two such solvents may be found which together form a constant (low) boiling mixture in which case such a mixture may be used in my system just as any single solvent. Such a binary mixture may possess a lowered freezing point.

I have found, however, that so-called "commercial" grades of liquefied normally gaseous materials (including hydrocarbons; "commercial propane" for example often containing some ethane, butane, isobutane and possibly slight amounts of other impurities) give highly satisfactory results.

While I have indicated the use of an inert atmosphere (such as nitrogen or carbon dioxide) as a supplemental gas to increase the total pressure within the filters, such is not essential for the operation of my system but is a highly desirable safety feature. If suitable precautions are taken to guard against open flames or sparks, the supplemental gas within the filter may be simply air. If a non-inflammable solvent is used it will, of course, not be necessary to use an inert gas within the filter. Similarly, even though an inflammable solvent be used (other than propane) if the solvent partial pressure at the temperature of operation within the filter system is such that the resulting solvent vapor-air mixture is outside (either above or below) the explosive limits, then air rather than an inert gas may be used.

I have not described the various pumps, gauges, meters, valves, and other required operating equipment of general nature because the arrangement thereof would be obvious to those skilled in the art.

All equipment operating at low temperatures may preferably be provided with heat insulation to avoid cold losses, as is customary in the art.

Instead of using the vacuum filter previously described as the means for mechanically separating the styrene crystals from the slurry containing them, I may, if desired, make use of one or more centrifuges for accomplishing a similar result. On the other hand, instead of using a vacuum rotary filter, I may make use of filters of the leaf or plate type.

It will be understood that the various steps of the process herein described will be carried out in suitable apparatus (conventional in design or otherwise) adapted to the respective purposes.

Accordingly, while I may have indicated certain types of equipment as generally suitable for performing certain operations, it is to be understood that such is merely illustrative.

While I have referred to "evaporation" and "rapid evaporation" of liquid solvent-refrigerant within the crystallizing zone whereby formation of styrene crystals is induced, it will be understood that the actual rates thereof may vary over wide limits.

Thus, the evaporation may be regulated in such manner as to be relatively slow—particularly if operating on a batch basis—with a correspondingly gradual temperature gradient with respect to the styrene-containing material undergoing direct refrigeration.

On the other hand, the evaporation may be made very rapid by suitably reducing the pressure within the crystallizing chamber, so that the resultant cooling effect will become very marked. Such cooling—with a correspondingly steep temperature gradient with respect to styrene-containing material undergoing direct refrigeration—may be so drastic as to be properly considered a "shock chilling." Such a shock chilling may be employed with particularly favorable results when operating continuously or semi-continuously upon relatively large quantities of crude styrene materials, in view of the fact that in spite of such drastic cooling the styrene crystals which are thus formed still retain their ability to permit substantially complete separation thereof from the mother liquor in which they were formed.

It will also be understood that my process may be operated batchwise, intermittently, continuously, continually, or in any combination thereof, as desired.

My process is particularly valuable for the recovery of styrene from crude styrene-containing materials and especially the crude styrene fraction obtained from light oil as heretofore indicated. The presence of certain other unsaturates in the crude styrene fraction seems to have no adverse effect on the degree of recovery of styrene.

Such other unsaturates may have a tendency to shift somewhat the eutectic point of the styrene fraction undergoing treatment, depending upon the boiling range of the particular light oil cut. In no case, however, have I found that the use of propane increases the styrene content of the eutectic composition derived from the cut (calculated on a propane-free basis) and therefore the advantages in using propane are retained over the widest possible operating conditions.

While my process is generally applicable to the purification and recovery of styrene from crude materials containing styrene and xylene, it is especially applicable to such materials derived from light oils.

Moreover, my process may also be applied with advantage to the purification of so-called commercial styrene with the result that an extremely pure material is obtained. Upon polymerization, the styrene thus treated yields a polymerized material of considerably higher melting point and improved electrical properties.

Generally speaking, the crude styrene-xylene material to which my cooling step is applied should be richer in styrene than the styrene-xylene eutectic mixture obtainable from such crude material, irrespective of whether the crude material is obtained by fractionally distilling light oil or otherwise.

It is to be understood that the foregoing description is by way of illustration. However, changes, omissions, additions, substitutions, and/or modifications may be made within the scope of the claims without departing from the spirit of the invention.

I claim:

1. A method for the recovery of styrene from a crude styrene-containing material which comprises subjecting a light oil obtained in the manufacture of gas to distillation under vacuum and in the substantial absence of steam and under conditions such that the maximum temperature of distillation does not exceed approximately 110° C., in order to obtain a styrene light oil fraction of styrene content substantially greater than 33%; admixing therewith a liquefied normally gaseous hydrocarbon while maintaining a temperature and pressure on the mixture such as to cause at least the major portion of said liquefied normally gaseous hydrocarbon to remain in liquid phase; introducing the resulting mixture into a pressure reduction zone and reducing the pressure on said mixture thereby causing evaporation of at least a portion of said liquefied normally gaseous hydrocarbon with consequent chilling of the remaining mixture, said chilling being sufficient to cause the formation of styrene crystals but insufficient to cause the formation of solid eutectic; passing the resulting slurry of styrene crystals in mother liquor into a separation zone under conditions such that the slurry does not undergo any considerable change in temperature, said separation zone being maintained at substantially lowered temperatures; separating styrene crystals from mother liquor in said separation zone; and removing adherent mother liquor from the said styrene crystals by washing them with a portion of said liquefied normally gaseous hydrocarbons.

2. In a method for recovering styrene from a mixture containing other hydrocarbons at least some of which have boiling points within about 20° C. of the boiling point of styrene, said styrene being in sufficiently high concentration in said mixture to separate therefrom in crystal form on cooling prior to the solidification of other material contained in said mixture, by contacting said mixture with a solvent fluid whose boiling point is below 0° C. at normal pressure, while maintaining pressure and temperature conditions such that the solution remains in liquid phase, materially reducing the pressure on the solution in a crystallization zone to cause evaporation of a portion of the solvent thereby chilling the solution until at least a portion of the styrene separates in crystal form, and separating the styrene crystals from the liquid phase material; the step which comprises circulating the mixture of styrene crystals and liquid phase material to and from said crystallization zone, and withdrawing at least a portion of such mixture from the circulating stream for separation of styrene crystals from the liquid phase thereof.

3. In a process for the separation of styrene by crystallization from a light oil styrene fraction, the steps of concentrating styrene in a light oil styrene fraction containing xylene sufficiently so that styrene crystals will form upon reduction in temperature of said concentrated fraction before the solidification of any other material including xylene, dissolving said concentrated fraction in a liquefied normally gaseous solvent substantially inert under the conditions obtaining, cooling the resulting solution sufficiently by the evaporation of a portion of said solvent to produce from said solution styrene crystals in a medium of liquid phase material including xylene, and separating said styrene crystals from said liquid phase material including xylene under temperature conditions sufficiently high to avoid the presence of any substantial quantity of other solidified material derived from said solution.

4. In a process for separating styrene by crystallization from a light oil styrene fraction, the steps of concentrating styrene in a light oil styrene fraction containing xylene, said concentration being sufficient to produce a styrene content in said fraction sufficiently high so that styrene crystals will form in said concentrated fraction before the solidification of any other material contained therein including xylene upon reduction in temperature of said concentrated fraction, dissolving said concentrated fraction in a liquefied normally gaseous hydrocarbon solvent, cooling the resulting solution by the evaporation of a sufficient portion of said liquefied solvent to produce from said solution styrene crystals in a liquid phase medium including xylene, and separating said styrene crystals from said liquid phase medium under temperature conditions sufficiently high to preclude the presence of any substantial quantity of other solid phase material derived from said solution.

5. In a process for separating styrene by crystallization from a light oil styrene fraction, the steps of concentrating by distillation a light oil fraction containing styrene and xylene to increase the styrene content thereof sufficiently so that upon reduction in temperature of said concentrated fraction styrene crystals will form before the solidification of eutectic containing styrene and xylene, dissolving said concentrated fraction in a liquefied normally gaseous solvent comprised of aliphatic hydrocarbon material of from 3 to 4 carbon atoms per molecule and of no greater unsaturation than one double bond per molecule, cooling the resulting solution by the evaporation of a sufficient portion of said liquefied solvent to produce from said solution styrene crystals in a liquid medium, and separating said styrene crystals from said liquid medium under temperature conditions sufficiently high to avoid the presence of any substantial quantity of other solidified material derived from said solution.

6. In a process for separating styrene by crystallization from a light oil styrene fraction, the steps of concentrating styrene in a light oil fraction obtained in the pyrolysis of petroleum oil and containing xylene so that the styrene content thereof is considerably in excess of 33%, dissolving said concentrated fraction in propane, evaporating a sufficient portion of said propane to cool the resulting solution sufficiently to produce from said solution styrene crystals in a liquid phase material including xylene and said liquefied propane, and separating said styrene crystals from said liquid phase material under temperature conditions sufficiently high to preclude the presence of any substantial quantity of solid eutectic containing styrene and xylene.

7. In a process for separating styrene by crystallization from a light oil styrene fraction, the steps of concentrating styrene in a light oil fraction obtained in the pyrolysis of petroleum oil and containing xylene so that the styrene content thereof is at least as high as approximately 50%, dissolving said concentrated fraction in propane, evaporating a sufficient portion of said propane to cool the resulting solution sufficiently to produce from said solution styrene crystals in a liquid phase material including xylene and said liquefied propane, and separating said styrene crystals from said liquid phase material under temperature conditions sufficiently high to preclude the presence of any substantial quantity of solid eutectic containing styrene and xylene.

8. In a process for obtaining styrene crystals from impure styrene material containing styrene in sufficiently high concentration so that styrene crystals will form from said material when in liquid phase upon reduction in temperature before the solidification of other material present therein, the steps of cooling said impure styrene material in liquid phase sufficiently to cause the formation of styrene crystals in a medium of unsolidified liquid phase material, and separating said styrene crystals from said liquid phase material under temperature conditions sufficiently high to preclude the presence of other solid material derived from said impure styrene material, said separation step including the washing of adhering liquid phase material from said styrene crystals with a wash liquid comprised of chilled liquefied normally gaseous material substantially inert under the conditions obtaining.

9. In a process for separating styrene by crystallization from a light oil styrene fraction, the steps of concentrating styrene in a light oil styrene fraction containing xylene sufficiently so that styrene crystals will form upon reduction in temperature of said concentrated fraction before the solidification of any other material including xylene, dissolving said concentrated fraction in a liquefied normally gaseous hydrocarbon solvent, cooling the resulting solution in a refrigerating zone sufficiently by the evaporation of a portion of said solvent to produce a suspension of styrene crystals in a medium of liquid phase material including xylene and said solvent, withdrawing said suspension of styrene crystals in liquid phase material from said refrigerating zone, recycling a portion of said withdrawn suspension to said refrigerating zone, passing another portion of said withdrawn suspension into a separating zone and therein separating styrene crystals from accompanying liquid phase material under temperature conditions sufficiently high to avoid the presence of any substantial quantity of other solidified material derived from said solution.

10. In a process for the separation of styrene by crystallization from a light oil styrene fraction, the steps of concentrating styrene in a light oil styrene fraction containing xylene sufficiently so that styrene crystals will form upon reduction in temperature of said concentrated fraction before the solidification of any other material present including xylene, dissolving said concentrated fraction in a liquefied normally gaseous saturated hydrocarbon solvent, cooling the resulting solution sufficiently by the evaporation of a portion of said solvent to produce from said solution styrene crystals in a medium of liquid phase material including xylene, separating said styrene crystals from said liquid phase material including xylene under temperature conditions sufficiently high to preclude the presence of any substantial quantity of other solidified material derived from said solution, and washing said separated crystals with a chilled portion of said liquefied normally gaseous saturated hydrocarbon solvent.

11. In a process for the crystallization of styrene from a liquid phase mixture of styrene and xylene, said styrene being in sufficiently high concentration in said mixture so that styrene crystals will form said mixture upon reduction in temperature thereof before the solidification of any other material present, the steps of dissolving said mixture of styrene and xylene in a liquefied normally gaseous solvent substantially inert under the conditions obtaining, cooling the resulting solution sufficiently by the evaporation of a portion of said solvent to produce from said solution styrene crystals in a medium of liquid phase material including xylene, and separating said styrene crystals from said liquid phase material including xylene under temperature conditions sufficiently high to preclude the presence of any substantial quantity of other solidified material derived from said solution.

12. In a process for the separation of styrene by crystallization from a light oil styrene fraction containing xylene and in which styrene is in sufficiently high concentration so that styrene crystals will form upon reduction in temperature of said fraction before the solidification of any other material present, the step of dissolving said fraction in a liquefied normally gaseous hydrocarbon solvent, cooling the resulting solution sufficiently by the evaporation of a portion of said solvent to produce from said solution styrene crystals in a medium of liquid phase material including xylene, and separating said styrene crystals from said liquid phase material including xylene under temperature conditions sufficiently high to avoid the presence of any substantial quantity of other solidified material derived from said solution.

HORACE M. WEIR.